US010696823B2

(12) United States Patent
Kimura

(10) Patent No.: US 10,696,823 B2
(45) Date of Patent: Jun. 30, 2020

(54) RUBBER COMPOSITION AND TIRE

(71) Applicant: BRIDGESTONE CORPORATION, Tokyo (JP)

(72) Inventor: Takumi Kimura, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/038,850

(22) PCT Filed: Nov. 27, 2014

(86) PCT No.: PCT/JP2014/005953
§ 371 (c)(1),
(2) Date: May 24, 2016

(87) PCT Pub. No.: WO2015/079703
PCT Pub. Date: Jun. 4, 2015

(65) Prior Publication Data
US 2016/0376426 A1 Dec. 29, 2016

(30) Foreign Application Priority Data
Nov. 27, 2013 (JP) ................. 2013-244956

(51) Int. Cl.
*C08L 7/00* (2006.01)
*C08K 3/36* (2006.01)
*C08L 61/04* (2006.01)
*B60C 1/00* (2006.01)
*C08L 93/04* (2006.01)
*C08L 57/02* (2006.01)

(52) U.S. Cl.
CPC .............. *C08L 7/00* (2013.01); *B60C 1/0016* (2013.01); *C08K 3/36* (2013.01); *C08L 57/02* (2013.01); *C08L 61/04* (2013.01); *C08L 93/04* (2013.01); *C08L 2205/03* (2013.01)

(58) Field of Classification Search
CPC ........................................................ C08L 7/00
USPC ....................................................... 524/518
See application file for complete search history.

(56) References Cited

U.S. PATENT DOCUMENTS

| 2006/0167165 | A1 | 7/2006 | Hirayama et al. |
| 2012/0031537 | A1 | 2/2012 | Izuchi |
| 2012/0264875 | A1 | 10/2012 | Berriot et al. |
| 2013/0303657 | A1 | 11/2013 | Miyazaki |
| 2013/0345337 | A1 | 12/2013 | Tsumori et al. |
| 2014/0011926 | A1 | 1/2014 | Fisher et al. |
| 2014/0107289 | A1 | 4/2014 | Fisher et al. |
| 2014/0155521 | A1 | 6/2014 | Miyazaki |
| 2015/0183971 | A1 | 7/2015 | Kawashima |
| 2016/0229992 | A1 | 8/2016 | Peters et al. |

FOREIGN PATENT DOCUMENTS

| EP | 2 149 588 A1 | 2/2010 |
| FR | 2980480 A1 | 3/2013 |
| FR | 2980481 A1 | 3/2013 |
| JP | 05-269884 A | 10/1993 |
| JP | 2003-003014 A | 1/2003 |
| JP | 3523613 B2 | 4/2004 |
| JP | 2006-63093 A | 3/2006 |
| JP | 2006199858 A | 8/2006 |
| JP | 2007186567 A | 7/2007 |
| JP | 2007-231085 A | 9/2007 |
| JP | 2008-208309 A | 9/2008 |
| JP | 2009001719 A | 1/2009 |
| JP | 2009-173783 A | 8/2009 |
| JP | 2009-256540 A | 11/2009 |
| JP | 2010-189604 A | 9/2010 |
| JP | 2011088998 A | 5/2011 |
| JP | 2011225731 A | 11/2011 |
| JP | 2012-031258 A | 2/2012 |
| JP | 2012-087175 A | 5/2012 |
| JP | 2012-092179 A | 5/2012 |
| JP | 2012-255076 A | 12/2012 |
| JP | 2013-053296 A | 3/2013 |
| JP | 2013509470 A | 3/2013 |
| JP | 2013-166826 A | 8/2013 |
| JP | 2013-216753 A | 10/2013 |

(Continued)

OTHER PUBLICATIONS

International Search Report of PCT/JP2014/005953 dated Mar. 3, 2015.
Machine-generated English translation of JP 3523613 B downloaded Jan. 11, 2017.
English Abstract of RU 2009143277A dated Jun. 27, 2011.
Communication dated Oct. 24, 2017 from the Russian Patent Office in counterpart Application No. 2016121033/05.
"Carbon Black", Tokai Carbon Co., Ltd., Internet <URL: http://www.tokaicarbon.co.jp/en/products/carbon_b/index.html>, Retrieved on Dec. 22, 2017, total 2 pages.

(Continued)

*Primary Examiner* — Duc Truong
(74) *Attorney, Agent, or Firm* — Sughrue Mion, PLLC

(57) ABSTRACT

Provided is a rubber composition that allows for manufacturing a tread rubber that is high in braking performance on a dry surface road and also high in braking performance even on a wet road surface such as a manhole surface that is slipperier than an asphalt road surface. The rubber composition is prepared by compounding a rubber component (A) including a natural rubber by 70 mass % or more, and by further compounding, with the rubber component as 100 parts by mass: (B) at least one kind of thermoplastic resins selected from among $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, at 5 parts by mass to 50 parts by mass; and (C) a filler including silica, at 20 parts by mass to 120 parts by mass, in which the filler (C) contains silica by 50 mass % to 100 mass %.

13 Claims, No Drawings

(56) References Cited

FOREIGN PATENT DOCUMENTS

| | | |
|---|---|---|
| JP | 2014009324 A | 1/2014 |
| JP | 2014-047295 A | 3/2014 |
| JP | 2014-234448 A | 12/2014 |
| JP | 2016531990 A | 10/2016 |
| WO | 2005090463 A1 | 9/2005 |
| WO | 2010/123015 A1 | 10/2010 |
| WO | 2013045482 A1 | 4/2013 |
| WO | 2013045483 A1 | 4/2013 |
| WO | 2013/169293 A1 | 11/2013 |

OTHER PUBLICATIONS

"Physicochemical Properties", Tokai Carbon Co., Ltd., Internet <URL: http://www.tokaicarbon.co.jp/en/products/carbon_b/seast/index.html>, Retrieved on Dec. 22, 2017, total 3 pages.

RUBBER COMPOSITION AND TIRE

CROSS REFERENCE TO RELATED APPLICATION

The present disclosure claims priority from Japanese Patent Application No. 2013-244956 (filed on Nov. 27, 2013), the entire disclosure of which is incorporated herein by reference.

TECHNICAL FIELD

A rubber composition and a tire using the same as the tread rubber are disclosed.

BACKGROUND

In view of improving vehicle safety, various studies have been made to improve tire's braking performance and driving performance not only on a dry road surface but on various road surfaces such as a wet road surface and an icy and snowy road surface. There has been known, for example, a technique of using, as a tread rubber, a rubber composition prepared by compounding an aroma oil, together with rubber components such as natural rubber (NR) and butadiene rubber (BR), in order to improve performance on a wet road surface (Patent Literature (PTL) 1).

In order to improve grip performance on an icy and snowy road surface and a wet road surface, there has also been known a technique of using, as a tread rubber, a rubber composition obtained by compounding $C_5$-based resins at 5 parts by mass to 50 parts by mass with the rubber component as 100 parts by mass, the rubber component including natural rubber and/or polyisoprene rubber by at least 30 mass % in total (PTL 2).

CITATION LIST

Patent Literature

PTL 1: JPH5-269884A
PTL 2: JP2009-256540A

SUMMARY

Technical Problem

However, the aforementioned techniques of compounding an aroma oil have involved the following problems. That is, an aroma oil is less compatible with NR and BR, and thus produces insufficient effect of improving performance on a wet road surface. In addition, a rubber composition compounded with an aroma oil is increased in rolling resistance. Meanwhile, the rubber composition obtained by compounding $C_5$-based resins at 5 parts by mass to 50 parts by mass with the rubber component as 100 parts by mass, the rubber component including natural rubber and/or polyisoprene rubber by at least 30 mass % in total, is not necessarily high in braking performance on a dry road surface, while failing to exhibit satisfactory wet braking performance on a road surface slipperier than an asphalt road surface.

It could therefore be helpful to provide a rubber composition that allows for manufacturing a tread rubber that is high in braking performance on a dry road surface as well as having high braking performance even on a wet road surface such as a manhole surface that is slipperier than an asphalt road surface. It could also be helpful to provide a tire using a tread rubber that is high in braking performance on a dry road surface as well as having high braking performance even on a wet road surface such as a manhole surface that is slipperier than an asphalt road surface.

Solution to Problem

The disclosed rubber composition is prepared by compounding a rubber component (A) including natural rubber by 70 mass % or more, and by further compounding, with the rubber component as 100 parts by mass: (B) at least one kind of thermoplastic resins selected from among $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, at 5 parts by mass to 50 parts by mass; and (C) a filler including silica, at 20 parts by mass to 120 parts by mass, in which the filler (C) contains silica by 50 mass % to 100 mass %.

A rubber composition, when compounded with the thermoplastic resin (B) selected from among $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, can be raised in glass transition temperature (Tg), improved in loss tangent (tan δ) at 0° C., and improved in tire performance on a wet road surface. The effect to be obtained by compounding the thermoplastic resin (B) is particularly conspicuous in a rubber composition that includes a rubber component including natural rubber by 70 mass % or more. Further, the rubber component itself has high flexibility with the content of natural rubber being 70 mass % or more, and thus exhibits high braking performance on a dry road surface and on a slippery wet road surface such as a manhole surface.

Further, silica is dispersed in the rubber component having the thermoplastic resin (B) fully dispersed therein, which allows for more flexible deformation of the rubber, with the result that the rubber is improved in follow-up ability on a road surface that is low in friction coefficient. This configuration further improves braking performance on a slippery wet road surface.

In the subject application, the "$C_5$-based resins" refer to $C_5$-based synthetic petroleum resins, or a solid polymer obtained by polymerizing $C_5$ fraction. The "$C_5$- to $C_9$-based resins" refer to $C_5$- to $C_9$-based synthetic petroleum resins, or a solid polymer obtained by polymerizing $C_5$ to $C_{11}$ fractions. The "$C_9$-based resins" refer to $C_9$-based synthetic resins, or a solid polymer obtained by polymerizing $C_9$ fraction.

Here, $C_5$ to $C_{11}$ fractions used in the polymerization of the solid polymer as the "$C_5$- to $C_9$-based resins" include fractions other than $C_5$ fraction and $C_9$ fraction.

In the disclosed rubber composition, the rubber component (A) may include styrene-butadiene copolymer rubber by 10 mass % to 30 mass %.

The rubber component compounded with a certain amount of a styrene-butadiene copolymer rubber is raised in glass transition temperature (Tg), which leads to an improvement in braking performance and driving stability on a dry road surface.

The filler (C) may contain silica by 90 mass % or more. The increased content of silica further improves braking performance on a slippery wet road surface.

The disclosed tire uses, as a tread rubber, any of the aforementioned rubber compositions.

A tire using any of the aforementioned rubber compositions as a tread rubber becomes excellent not only in braking performance on a wet road surface but also in braking performance on a dry road surface and a slippery wet road surface such as a manhole surface.

Advantageous Effect

The disclosed rubber composition allows for manufacturing a tread rubber that is high in braking performance on a dry road surface and also high in braking performance on a wet road surface such as a manhole surface that is slipperier than an asphalt road surface. The disclosed rubber composition also provides a tire using a tread rubber that is high in braking performance on a dry road surface and also high in braking performance on a wet road surface such as a manhole surface that is slipperier than an asphalt road surface.

DETAILED DESCRIPTION

<Rubber Composition>

The disclosed rubber composition is prepared by compounding (A) a rubber component including natural rubber by 70 mass % or more; and by further compounding, with the rubber component as 100 parts by mass: (B) at least one kind of thermoplastic resins selected from among $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, at 5 parts by mass to 50 parts by mass; and (C) a filler including silica, at 20 parts by mass to 120 parts by mass, in which the filler (C) contains silica by 50 mass % to 100 mass %.

<<Rubber Component (A)>>

The rubber component (A) used in the disclosed rubber composition includes: natural rubber (NR) by 70 mass % or more, or suitably by 80 mass % or more. The rubber component (A) contains NR by 70 mass % or more, which provides an effect of allowing sufficient effect to be readily produced when $C_5$-based resins are compounded, as will be described later.

The rubber component (A) may further include styrene-butadiene copolymer rubber (SBR) by 5 mass % to 30 mass %, in particular, by 10 mass % to 20 mass %. The rubber composition compounded with SBR is raised in glass transition temperature (Tg), which improves steering stability and braking performance on a dry road surface. Such effects may potentially be insufficient when the SBR content in the rubber component (A) falls below 10 mass %. Meanwhile, when the SBR content in the rubber component (A) exceeds 30 mass %, the NR content in the rubber component (A) inevitably falls below 70 mass %, which potentially reduces the aforementioned effect to be produced through compounding NR, while potentially causing such problems as increased rolling resistance due to increase of heat generation in the rubber and reduced road surface follow-up ability on a slippery wet road surface due to reduction in flexibility of the rubber.

The rubber component (A) may contain, as appropriate, butadiene rubber, acrylonitrile-butadiene copolymer rubber, chloroprene rubber, polyisoprene rubber, as other rubber materials.

<<Thermoplastic Resin (B)>>

The disclosed rubber composition is obtained by compounding at least one kind of thermoplastic resin (B) selected from among $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, at 5 parts by mass to 50 parts by mass, with the rubber component (A) as 100 parts by mass. The disclosed rubber composition compounded with the thermoplastic resin (B) to a regulated amount is raised in glass transition temperature (Tg) and improved in loss tangent (tan δ) at 0° C., and thus can be improved in tire performance mainly on a wet road surface. As described above, the rubber component (A) contains NR by 70 mass % or more as described above. Here, the aforementioned thermoplastic resin (B) is highly compatible with NR, which particularly contributes to readily obtaining the aforementioned effect.

In this disclosure, the "$C_5$-based resins" refer to $C_5$-based synthetic petroleum resins, which is, for example, a solid polymer obtained by polymerizing $C_5$ fraction using a catalyst for the Friedel-Crafts reaction, such as $AlCl_3$ and $BF_3$. Specific examples thereof may include: a copolymer including, as main components, isoprene, cyclopentadiene, 1,3-pentadiene, and 1-pentene; a copolymer of 2-pentene and dicyclopentadiene; and a polymer mainly composed of 1,3-pentadiene.

Here, $C_5$-based resins may be used as the thermoplastic resin (B) so as to further improve braking performance even on an icy and snowy road surface.

The "$C_5$- to $C_9$-based resins" disclosed herein refer to $C_5$- to $C_9$-based synthetic petroleum resins exemplified by a solid polymer obtained by polymerizing $C_5$ to $C_{11}$ fractions using a catalyst for the Friedel-Crafts reaction, such as $AlCl_3$ and $BF_3$. Examples of the "$C_5$- to $C_9$-based resins" may include a copolymer including, as main components, styrene, vinyltoluene, α-methylstyrene, and indene. This $C_5$- to $C_9$-based resins disclosed herein may preferably include less component of $C_9$ or more, in view of the compatibility with the component (A). Here, including "less component of $C_9$ or more" means that the component of $C_9$ or more based on the total amount of the resin is less than 50 mass %, or preferably less than 40 mass %.

The thermoplastic resin (B) using $C_5$- to $C_9$-based resins may also improve handling performance.

Here, the $C_5$ to $C_{11}$ fractions to be used in polymerizing a solid polymer as the "$C_5$- to $C_9$-based resins" include other fractions than $C_5$ fraction and $C_9$ fraction.

The disclosed "$C_9$-based resins" refers to $C_9$-based synthetic petroleum resins exemplified by a solid polymer obtained by polymerizing $C_9$ fraction using a catalyst for the Friedel-Crafts reaction, such as $AlCl_3$ and $BF_3$. Examples of the "$C_9$-based resin" may include a copolymer including, as main components, indene, α-methylstyrene, and vinyltoluene.

The thermoplastic resin (B) using $C_9$-based resins may also improve handling performance.

The aforementioned terpene-based resin is a solid-state resin obtained by compounding turpentine to be obtained simultaneously in obtaining rosin from trees of *Pinus*, or a polymerizable component separated from the turpentine, and by polymerizing the turpentine or the polymerizable component using a catalyst for the Friedel-Crafts reaction. Examples of the terpene-based resin may include: β-pinene resins; and α-pinene resins. Further, a typical example of the terpene-aromatic compound-based resins may include terpene-phenol resins. The terpene-phenol resins may be obtained through various methods including: causing terpenoids and various phenols to react with each other using a catalyst for the Friedel-Crafts reaction, or further condensing the resultant with formalin. Terpenoids for use as the material are not particularly limited, and may preferably be a monoterpene hydrocarbon such as α-pinenes and limonenes, more preferably terpenoids including α-pinenes, and particularly preferably be α-pienes. In the disclosed rubber composition, terpene-phenol resins with a smaller ratio of phenol component may suitably be used. Here, the "smaller ratio of phenol component" refers to the ratio of phenol component to be 50 mass % or less, or preferably 40 mass % or less in the total amount of resin.

The thermoplastic resin (B) using terpene-aromatic compound-based resins, in particular, terpene-phenol resins may further improve handling performance.

The aforementioned rosin-based resins may include, as a natural resin rosin: a gum rosin, a tall oil rosin, and a wood rosin, which are included in a raw rosin or a tall oil; and also include, as a modified rosin, a rosin derivative, and a modified rosin derivative, for example: a polymeric rosin and its partially hydrogenated rosin; a glycerin ester rosin and its partially hydrogenated rosin or completely hydrogenated rosin; and a pentaerythritol ester rosin and its partially hydrogenated rosin or polymeric rosin.

The thermoplastic resin (B) using rosin-based resins may also improve handling performance.

The aforementioned dicyclopentadiene resins refer to, for example, resins obtained by polymerizing dicyclopentadiene using a catalyst for the Friedel-Crafts reaction, such as $AlCl_3$ and $BF_3$. Specific examples of commercially-available dicyclopentadiene resins may include: Quinton 1920 (Nippon Zeon Co., Ltd.); Quinton 1105 (Nippon Zeon Co., Ltd.); and Marukarettsu M-890A (Maruzen Oil Chemical Co., Ltd.).

The thermoplastic resin (B) using dicyclopentadiene resins may also improve braking performance on an icy and snowy road surface.

The aforementioned alkylphenol-based resins may be exemplified by an alkylphenol-acetylene resin such as, for example, a p-tert-butylphenol-acetylene resin, and an alkylphenol-formaldehyde resin having a low degree of polymerization.

The thermoplastic resin (B) using an alkylphenol-based resin may also improve handling performance.

The aforementioned thermoplastic resin (B) is compounded at 5 parts by mass to 50 parts by mass, preferably 10 parts by mass to 30 parts by mass, with the rubber component (A) as 100 parts by mass. The compounding amount of the thermoplastic resin (B) may be regulated to 5 parts by mass to 50 parts by mass, with the rubber component (A) as 100 parts by mass, to thereby ensure desired rupture properties and wear resistance. When the compounding amount of the thermoplastic resin falls below 5 parts by mass, braking performance on a wet road surface is less likely to be satisfactory, while the amount exceeding 50 parts by mass leads to a fear that a desired wear resistance or rupture resistance be less likely to be obtained.

<<(C) Filler>>

The disclosed rubber composition is compounded with the filler (C) at 20 parts by mass to 120 parts by mass, preferably 50 parts by mass to 100 parts by mass, with the rubber component (A) as 100 parts by mass. Further, the filler (C) contains silica by 50 mass % to 100 mass %, preferably 80 mass % to 100 mass %, more preferably 90 mass % to 100 mass %. That is, the disclosed rubber composition contains, with the rubber component (A) as 100 parts by mass, silica at 10 parts by mass to 120 parts by mass, preferably 45 parts by mass to 100 parts by mass. The compounding amount of the filler (C) may be regulated to 20 parts by mass to 120 parts by mass with the rubber component (A) as 100 parts mass, so as to produce an effect of reinforcing the rubber component (A) without impairing such property as flexibility thereof. Further, the filler (C) compounded with silica by 50 mass % to 100 mass % advantageously provides an effect of reducing rolling resistance and improving in particular braking performance on a wet road surface while suppressing to minimum the degradation of flexibility of the rubber component.

The disclosed rubber composition compounded with silica provides the following effect. That is, in a state where the NR and the thermoplastic resin (B) are favorably dispersed, the disclosed rubber provides sufficient reinforcing property and low heat generation, without impairing the flexibility thereof. Accordingly, the disclosed rubber composition is flexible enough to have high follow-up property to follow a road surface that is low in friction coefficient (for example, a slippery wet road surface such as a manhole surface), to thereby produce sufficient braking performance on such a slippery wet road surface.

Examples of silica may include, for example, wet silica (hydrous silica), dry silica (anhydrous silica), calcium silicate, aluminum silicate, with wet silica being suitably used in particular. The wet silica has BET specific surface area of preferably 40 $m^2$/g to 350 $m^2$/g, more preferably 150 $m^2$/g to 300 $m^2$/g, and further preferably 200 $m^2$/g to 250 $m^2$/g. Silica having the BET specific surface area falling within the aforementioned ranges can advantageously attain both rubber reinforcing property and dispersiveness into the rubber component. In light thereof, silica may preferably have the BET specific surface area falling within a range of 80 $m^2$/g to 300 $m^2$/g. Commercially-available examples of such silica may include "Nipsil AQ", "Nipsil KQ" (trade name) produced by Tosoh Silica Corporation, and "ULTRASIL VN3" (trade name) produced by Evonik Industries AG, which may be used alone or in combination of two or more kinds thereof.

The filler (C) may be compounded with, as appropriate, in addition to silica, for example: carbon black, aluminum oxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate.

<<Silane Coupling Agent>>

The disclosed rubber composition may be compounded with a silane coupling agent for the purpose of further improving the reinforcing property and low heat generation of silica contained in the rubber composition.

Examples of the silane coupling agent may include, for example, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylprpopyl-N,N-dimethylthiocarbamoyltetrasulfide, 3-triethoxysilylprpopyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazolyltetrasulfide, among which bis(3-triethoxysilylpropyl)

polysulfide and 3-trimethoxysilylpropylbenzothiazoletetrasulfide are suited for use in view of the reinforcement improving effect.

Of the aforementioned silane coupling agents, one kind may be used alone, or two or more kinds may be used in combination.

In the disclosed rubber composition, a preferred compounding amount of the silane coupling agent, which may vary depending on the kind of the silane coupling agent or the like, is preferably selected to fall within a range of 2 mass % to 25 mass % relative to the amount of silica. When the amount is less than 2 mass %, the silane coupling agent fails to fully exert the effect thereof, while the amount exceeding 25 mass % may leads to a fear of causing gelation of the rubber component. In light of the effect as the coupling agent and preventing gelation, the compounding amount of the silane coupling agent may more preferably fall within the range of 2 mass % to 20 mass %, further preferably within a range of 5 mass % to 18 mass %, and particularly preferably within a range of 5 mass % to 15 mass %.

<<Softener (D)>>

The disclosed rubber composition may be obtained by further compounding a softener (D). Here, examples of the softener (D) may include: a petroleum-based softener such as an aroma oil, a paraffin oil, and a naphthene oil; and a plant-based softener such as a palm oil, a castor oil, a cottonseed oil, and a soybean oil. The softener (D) to be compounded may preferably be in a liquid state at ordinary temperature such as 25° C. in view of handling easiness. Of those described above, for example, a petroleum-based softener such as an aroma oil, a paraffin oil, and a naphthene oil is preferred, but preferably no plant-based softener should be compounded. Then, in compounding the softener (D), the rubber composition may be prepared by compounding the softener (D) preferably at 10 parts by mass or less, or more preferably 5 parts by mass or less, with the rubber component (A) as 100 parts by mass. The amount of the softener (D) is 10 parts by mass or less with the rubber component (A) as 100 parts by mass, which can enhance the effect of improving braking performance on a wet road surface such as a manhole surface that is slipperier than an asphalt road surface. However, in view of braking performance on a wet road surface, it is particularly preferred not to compound the softener (D) in the disclosed rubber composition.

The disclosed rubber composition may be compounded with, in addition to the rubber component (A), the thermoplastic resin (B), the filler (C), and the softener (D) described above, other compounding agents generally used in the rubber industry, such as, for example, an antioxidant, a vulcanization accelerator, a vulcanization accelerator aid, and a vulcanizing agent, which may be selected as appropriate without affecting the object of the present disclosure, within a range of general amount. Commercially-available agents may suitably be used as the compounding agents. The disclosed rubber composition may be manufactured by compounding the rubber component (A) including NR, with the thermoplastic resin (B), the filler (C), the softener (D) selected as appropriate, and/or various compounding agents, and by subjecting the resulting compound to such process as kneading, warming, and extrusion.

The disclosed tire uses the aforementioned rubber composition as the tread rubber. The aforementioned rubber composition is used as the tread rubber to form a raw tire, and the raw tire may be vulcanized with a usual method, to thereby manufacture the disclosed tire. The tread rubber of the disclosed tire uses the aforementioned rubber composition, and thus, the disclosed tire is particularly excellent both in icy and snowy road performance and wet road performance. The disclosed tire may be filled with ordinary air or air adjusted in partial pressure of oxygen, and may also be filled with an inert gas such as nitrogen, argon, and helium.

EXAMPLES

The disclosed rubber composition is described in further detail with reference to Examples illustrated in below. However, the disclosed rubber composition is not limited at all to the following Examples.

Rubber compositions were prepared according to the formulations shown in Tables 1 to 6. The rubber compositions thus prepared were each used as the tread rubber to fabricate, with a general method, a radial tire in a size of 195/65R15 for a passenger vehicle.

<Braking Performance on a Steel-Plate Wet Road Surface>

Four test tires were mounted onto a passenger vehicle of 2000 cc displacement. The passenger vehicle was run on a steel-plate wet road evaluation path as a test course. Then, the vehicle was braked at the speed of 40 km/h to lock the tires, so as to measure the distance it took to stop. The results thereof were indexed using the numeric value of Control as 100 as to the inverse of the distance. The larger index value shows more excellent performance on a steel-plate wet road surface.

Here, in Tables 1 and 2, Comparative Example 1 served as Control; in Table 3, Comparative Example 14 served as Control; in Table 4, Comparative Example 19 served as Control; in Table 5, Comparative Example 20 served as Control; and in Table 6, Comparative Example 25 served as Control.

<Braking Performance on a Dry Road Surface>

Four test tires were mounted onto a passenger vehicle of 2000 cc displacement. The passenger vehicle was run on an asphalt evaluation path as a test course. Then, the vehicle was braked at the speed of 80 km/h to lock the tires, so as to measure the distance it took to stop. The results thereof were indexed using the numeric value of Control as 100 as to the inverse of the distance. The larger index value shows more excellent performance on a dry road surface.

Here, in Tables 1 and 2, Comparative Example 1 served as Control; in Table 3, Comparative Example 14 served as Control; in Table 4, Comparative Example 19 served as Control; in Table 5, Comparative Example 20 served as Control; and in Table 6, Comparative Example 25 served as Control.

TABLE 1

|  |  |  | Comparative Example 1 | Comparative Example 2 | Comparative Example 3 | Comparative Example 4 | Comparative Example 5 | Comparative Example 6 | Example 1 | Example 2 |
|---|---|---|---|---|---|---|---|---|---|---|
| Rubber Composition | (A) | NR *1 | 60 | 60 | 70 | 80 | 90 | 100 | 85 | 100 |
|  |  | BR *2 | 40 | 40 | 30 | 20 | 10 | 0 | 0 | 0 |

TABLE 1-continued

| Formulation | | | | | | | | | |
|---|---|---|---|---|---|---|---|---|---|
| (parts by mass) | SBR *3 | 0 | 0 | 0 | 0 | 0 | 0 | 15 | 0 |
| | (B) C₅-based resins *4 | 15 | 15 | 15 | 15 | 15 | 15 | 15 | 30 |
| | C₅- to C₉-based resins *5 | 0 | 0 | 0 | 0 | 0 | 0 | 0 | 0 |
| | C₉-based resins *6 | 0 | 0 | 0 | 0 | 0 | 0 | 0 | 0 |
| | terpene-phenol resins *7 | 0 | 0 | 0 | 0 | 0 | 0 | 0 | 0 |
| | rosin-based resins *8 | 0 | 0 | 0 | 0 | 0 | 0 | 0 | 0 |
| | alkylphenol-based resins *9 | 0 | 0 | 0 | 0 | 0 | 0 | 0 | 0 |
| | dicyclopentadiene resins *10 | 0 | 0 | 0 | 0 | 0 | 0 | 0 | 0 |
| | (C) CB *11 | 40 | 48 | 48 | 48 | 48 | 48 | 8 | 8 |
| | Silica A *12 | 40 | 32 | 32 | 32 | 32 | 32 | 72 | 72 |
| | Silica B *13 | 0 | 0 | 0 | 0 | 0 | 0 | 0 | 0 |
| | Silica C *14 | 0 | 0 | 0 | 0 | 0 | 0 | 0 | 0 |
| | Silica D *15 | 0 | 0 | 0 | 0 | 0 | 0 | 0 | 0 |
| | (D) Aroma Oil | 0 | 0 | 0 | 0 | 0 | 0 | 0 | 0 |
| | Naphthene Oil | 0 | 0 | 0 | 0 | 0 | 0 | 0 | 0 |
| | Palm Oil | 0 | 0 | 0 | 0 | 0 | 0 | 0 | 0 |
| | Stearic Acid | 2 | 2 | 2 | 2 | 2 | 2 | 2 | 2 |
| | Antioxidant *16 | 1 | 1 | 1 | 1 | 1 | 1 | 1 | 1 |
| | Zinc Oxide | 2 | 2 | 2 | 2 | 2 | 2 | 2 | 2 |
| | Vulcanization Accelerator *17 | 0.8 | 0.8 | 0.8 | 0.8 | 0.8 | 0.8 | 0.8 | 0.8 |
| | Sulfur | 1.5 | 1.5 | 1.5 | 1.5 | 1.5 | 1.5 | 1.5 | 1.5 |
| Silica Content (mass %) in Filler (C) | | 50 | 40 | 40 | 40 | 40 | 40 | 90 | 90 |
| Content (parts by mass) of Filler (C) | | 80 | 80 | 80 | 80 | 80 | 80 | 80 | 80 |
| Tire Performance | Braking Performance on a Steel-Plate Wet Road Surface | 100 | 101 | 101 | 102 | 103 | 105 | 123 | 125 |
| | Braking Performance on a Dry Road Surface | 100 | 101 | 102 | 103 | 104 | 105 | 106 | 104 |

| | | Example 3 | Example 4 | Comparative Example 7 | Example 5 | Example 6 | Example 7 | Example 8 | Example 9 |
|---|---|---|---|---|---|---|---|---|---|
| Rubber Composition Formulation (parts by mass) | (A) NR *1 | 100 | 100 | 100 | 85 | 85 | 100 | 100 | 100 |
| | BR *2 | 0 | 0 | 0 | 0 | 0 | 0 | 0 | 0 |
| | SBR *3 | 0 | 0 | 0 | 15 | 15 | 0 | 0 | 0 |
| | (B) C₅-based resins *4 | 45 | 5 | 2 | 0 | 0 | 0 | 0 | 0 |
| | C₅- to C₉-based resins *5 | 0 | 0 | 0 | 15 | 0 | 0 | 0 | 0 |
| | C₉-based resins *6 | 0 | 0 | 0 | 0 | 0 | 15 | 0 | 0 |
| | terpene-phenol resins *7 | 0 | 0 | 0 | 0 | 15 | 0 | 0 | 0 |
| | rosin-based resins *8 | 0 | 0 | 0 | 0 | 0 | 0 | 15 | 0 |
| | alkylphenol-based resins *9 | 0 | 0 | 0 | 0 | 0 | 0 | 0 | 15 |
| | dicyclopentadiene resins *10 | 0 | 0 | 0 | 0 | 0 | 0 | 0 | 0 |
| | (C) CB *11 | 8 | 8 | 8 | 8 | 8 | 8 | 8 | 8 |
| | Silica A *12 | 72 | 72 | 72 | 72 | 72 | 72 | 72 | 72 |
| | Silica B *13 | 0 | 0 | 0 | 0 | 0 | 0 | 0 | 0 |
| | Silica C *14 | 0 | 0 | 0 | 0 | 0 | 0 | 0 | 0 |
| | Silica D *15 | 0 | 0 | 0 | 0 | 0 | 0 | 0 | 0 |
| | (D) Aroma Oil | 0 | 0 | 0 | 0 | 0 | 0 | 0 | 0 |
| | Naphthene Oil | 0 | 0 | 0 | 0 | 0 | 0 | 0 | 0 |
| | Palm Oil | 0 | 0 | 0 | 0 | 0 | 0 | 0 | 0 |
| | Stearic Acid | 2 | 2 | 2 | 2 | 2 | 2 | 2 | 2 |
| | Antioxidant *16 | 1 | 1 | 1 | 1 | 1 | 1 | 1 | 1 |
| | Zinc Oxide | 2 | 2 | 2 | 2 | 2 | 2 | 2 | 2 |
| | Vulcanization Accelerator *17 | 0.8 | 0.8 | 0.8 | 0.8 | 0.8 | 0.8 | 0.8 | 0.8 |
| | Sulfur | 1.5 | 1.5 | 1.5 | 1.5 | 1.5 | 1.5 | 1.5 | 1.5 |
| Silica Content (mass %) in Filler (C) | | 90 | 90 | 90 | 90 | 90 | 90 | 90 | 90 |
| Content (parts by mass) of Filler (C) | | 80 | 80 | 80 | 80 | 80 | 80 | 80 | 80 |
| Tire Performance | Braking Performance on a Steel-Plate Wet Road Surface | 128 | 112 | 102 | 117 | 118 | 120 | 118 | 121 |
| | Braking Performance on a Dry Road Surface | 100 | 100 | 99 | 101 | 102 | 105 | 104 | 103 |

TABLE 2

| | | Example 10 | Comparative Example 8 | Example 11 | Comparative Example 9 | Example 12 | Comparative Example 13 | Example 14 | Example 15 |
|---|---|---|---|---|---|---|---|---|---|
| Rubber Composition Formulation (parts by mass) | (A) NR *1 | 100 | 100 | 100 | 100 | 100 | 100 | 100 | 100 |
| | BR *2 | 0 | 0 | 0 | 0 | 0 | 0 | 0 | 0 |
| | SBR *3 | 0 | 0 | 0 | 0 | 0 | 0 | 0 | 0 |
| | (B) C₅-based resins *4 | 0 | 0 | 0 | 0 | 0 | 0 | 0 | 0 |
| | C₅- to C₉-based resins *5 | 0 | 0 | 0 | 0 | 0 | 0 | 0 | 0 |
| | C₉-based resins *6 | 0 | 2 | 15 | 2 | 15 | 15 | 15 | 15 |
| | terpene-phenol resins *7 | 0 | 0 | 0 | 0 | 0 | 0 | 0 | 0 |
| | rosin-based resins *8 | 0 | 0 | 0 | 0 | 0 | 0 | 0 | 0 |
| | alkylphenol-based resins *9 | 0 | 0 | 0 | 0 | 0 | 0 | 0 | 0 |
| | dicyclopentadiene resins *10 | 15 | 0 | 0 | 0 | 0 | 0 | 0 | 0 |

TABLE 2-continued

|  |  |  |  |  |  |  |  |  |  |
|---|---|---|---|---|---|---|---|---|---|
| (C) | CB *11 | 8 | 8 | 8 | 8 | 8 | 8 | 8 | 8 |
|  | Silica A *12 | 72 | 72 | 72 | 72 | 0 | 0 | 0 | 72 |
|  | Silica B *13 | 0 | 0 | 0 | 0 | 72 | 0 | 0 | 0 |
|  | Silica C *14 | 0 | 0 | 0 | 0 | 0 | 72 | 0 | 0 |
|  | Silica D *15 | 0 | 0 | 0 | 0 | 0 | 0 | 72 | 0 |
| (D) | Aroma Oil | 0 | 0 | 2 | 2 | 0 | 0 | 0 | 0 |
|  | Naphthene Oil | 0 | 0 | 0 | 0 | 0 | 0 | 0 | 2 |
|  | Palm Oil | 0 | 0 | 0 | 0 | 0 | 0 | 0 | 0 |
|  | Stearic Acid | 2 | 2 | 2 | 2 | 2 | 2 | 2 | 2 |
|  | Antioxidant *16 | 1 | 1 | 1 | 1 | 1 | 1 | 1 | 1 |
|  | Zinc Oxide | 2 | 2 | 2 | 2 | 2 | 2 | 2 | 2 |
|  | Vulcanization Accelerator *17 | 0.8 | 0.8 | 0.8 | 0.8 | 0.8 | 0.8 | 0.8 | 0.8 |
|  | Sulfur | 1.5 | 1.5 | 1.5 | 1.5 | 1.5 | 1.5 | 1.5 | 1.5 |
| Silica Content (mass %) in Filler (C) | | 90 | 90 | 90 | 90 | 90 | 90 | 90 | 90 |
| Content (parts by mass) of Filler (C) | | 80 | 80 | 80 | 80 | 80 | 80 | 80 | 80 |
| Tire Performance | Braking Performance on a Steel-Plate Wet Road Surface | 116 | 100 | 113 | 101 | 109 | 109 | 111 | 113 |
|  | Braking Performance on a Dry Road Surface | 104 | 100 | 105 | 100 | 105 | 105 | 105 | 105 |

|  |  | Comparative Example 10 | Example 16 | Comparative Example 11 | Example 17 | Comparative Example 12 | Example 18 | Comparative Example 13 |
|---|---|---|---|---|---|---|---|---|
| Rubber Composition Formulation (parts by mass) | (A) NR *1 | 100 | 100 | 100 | 100 | 100 | 100 | 100 |
|  | BR *2 | 0 | 0 | 0 | 0 | 0 | 0 | 0 |
|  | SBR *3 | 0 | 0 | 0 | 0 | 0 | 0 | 0 |
|  | (B) C$_5$-based resins *4 | 0 | 0 | 0 | 0 | 0 | 0 | 0 |
|  | C$_5$- to C$_9$-based resins *5 | 0 | 0 | 0 | 0 | 0 | 0 | 0 |
|  | C$_9$-based resins *6 | 2 | 15 | 2 | 15 | 2 | 15 | 2 |
|  | terpene-phenol resins *7 | 0 | 0 | 0 | 0 | 0 | 0 | 0 |
|  | rosin-based resins *8 | 0 | 0 | 0 | 0 | 0 | 0 | 0 |
|  | alkylphenol-based resins *9 | 0 | 0 | 0 | 0 | 0 | 0 | 0 |
|  | dicyclopentadiene resins *10 | 0 | 0 | 0 | 0 | 0 | 0 | 0 |
|  | (C) CB *11 | 8 | 8 | 8 | 8 | 8 | 8 | 8 |
|  | Silica A *12 | 72 | 72 | 72 | 72 | 72 | 72 | 72 |
|  | Silica B *13 | 0 | 0 | 0 | 0 | 0 | 0 | 0 |
|  | Silica C *14 | 0 | 0 | 0 | 0 | 0 | 0 | 0 |
|  | Silica D *15 | 0 | 0 | 0 | 0 | 0 | 0 | 0 |
|  | (D) Aroma Oil | 0 | 0 | 0 | 10 | 10 | 12 | 12 |
|  | Naphthene Oil | 2 | 0 | 0 | 0 | 0 | 0 | 0 |
|  | Palm Oil | 0 | 2 | 2 | 0 | 0 | 0 | 0 |
|  | Stearic Acid | 2 | 2 | 2 | 2 | 2 | 2 | 2 |
|  | Antioxidant *16 | 1 | 1 | 1 | 1 | 1 | 1 | 1 |
|  | Zinc Oxide | 2 | 2 | 2 | 2 | 2 | 2 | 2 |
|  | Vulcanization Accelerator *17 | 0.8 | 0.8 | 0.8 | 0.8 | 0.8 | 0.8 | 0.8 |
|  | Sulfur | 1.5 | 1.5 | 1.5 | 1.5 | 1.5 | 1.5 | 1.5 |
| Silica Content (mass %) in Filler (C) | | 90 | 90 | 90 | 90 | 90 | 90 | 90 |
| Content (parts by mass) of Filler (C) | | 80 | 80 | 80 | 80 | 80 | 80 | 80 |
| Tire Performance | Braking Performance on a Steel-Plate Wet Road Surface | 100 | 106 | 99 | 115 | 103 | 115 | 106 |
|  | Braking Performance on a Dry Road Surface | 100 | 102 | 99 | 106 | 101 | 106 | 101 |

TABLE 3

|  |  | Comparative Example 14 | Comparative Example 15 | Comparative Example 16 | Comparative Example 17 | Comparative Example 18 | Example 19 | Example 20 | Example 21 |
|---|---|---|---|---|---|---|---|---|---|
| Rubber Composition Formulation (parts by mass) | (A) NR *1 | 70 | 70 | 70 | 70 | 70 | 70 | 70 | 70 |
|  | BR *2 | 30 | 30 | 30 | 30 | 30 | 30 | 30 | 30 |
|  | SBR *3 | 0 | 0 | 0 | 0 | 0 | 0 | 0 | 0 |
|  | (B) C$_5$-based resins *4 | 0 | 0 | 0 | 0 | 15 | 15 | 15 | 15 |
|  | C$_5$- to C$_9$-based resins *5 | 0 | 0 | 0 | 0 | 0 | 0 | 0 | 0 |
|  | C$_9$-based resins *6 | 0 | 0 | 0 | 0 | 0 | 0 | 0 | 0 |
|  | terpene-phenol resins *7 | 0 | 0 | 0 | 0 | 0 | 0 | 0 | 0 |
|  | rosin-based resins *8 | 0 | 0 | 0 | 0 | 0 | 0 | 0 | 0 |
|  | alkylphenol-based resins *9 | 0 | 0 | 0 | 0 | 0 | 0 | 0 | 0 |
|  | dicyclopentadiene resins *10 | 0 | 0 | 0 | 0 | 0 | 0 | 0 | 0 |
|  | (C) CB *11 | 48 | 40 | 32 | 8 | 48 | 40 | 32 | 8 |
|  | Silica A *12 | 32 | 40 | 48 | 72 | 32 | 40 | 48 | 72 |
|  | Silica B *13 | 0 | 0 | 0 | 0 | 0 | 0 | 0 | 0 |
|  | Silica C *14 | 0 | 0 | 0 | 0 | 0 | 0 | 0 | 0 |
|  | Silica D *15 | 0 | 0 | 0 | 0 | 0 | 0 | 0 | 0 |

TABLE 3-continued

|  |  | Comparative Example 14 | Comparative Example 15 | Comparative Example 16 | Comparative Example 17 | Comparative Example 18 | Example 19 | Example 20 | Example 21 |
|---|---|---|---|---|---|---|---|---|---|
|  | (D) Aroma Oil | 15 | 15 | 15 | 15 | 0 | 0 | 0 | 0 |
|  | Naphthene Oil | 0 | 0 | 0 | 0 | 0 | 0 | 0 | 0 |
|  | Palm Oil | 0 | 0 | 0 | 0 | 0 | 0 | 0 | 0 |
|  | Stearic Acid | 2 | 2 | 2 | 2 | 2 | 2 | 2 | 2 |
|  | Antioxidant *16 | 1 | 1 | 1 | 1 | 1 | 1 | 1 | 1 |
|  | Zinc Oxide | 2 | 2 | 2 | 2 | 2 | 2 | 2 | 2 |
|  | Vulcanization Accelerator *17 | 0.8 | 0.8 | 0.8 | 0.8 | 0.8 | 0.8 | 0.8 | 0.8 |
|  | Sulfur | 1.5 | 1.5 | 1.5 | 1.5 | 1.5 | 1.5 | 1.5 | 1.5 |
| Silica Content (mass %) in Filler (C) |  | 40 | 50 | 60 | 90 | 40 | 50 | 60 | 90 |
| Content (parts by mass) of Filler (C) |  | 80 | 80 | 80 | 80 | 80 | 80 | 80 | 80 |
| Tire Performance | Braking Performance on a Steel-Plate Wet Road Surface | 100 | 102 | 104 | 108 | 107 | 117 | 121 | 127 |
|  | Braking Performance on a Dry Road Surface | 100 | 99 | 98 | 95 | 105 | 104 | 104 | 103 |

TABLE 4

|  |  |  | Comparative Example 19 | Example 22 | Example 23 | Example 24 | Example 25 |
|---|---|---|---|---|---|---|---|
| Rubber Composition Formulation (parts by mass) | (A) | NR *1 | 60 | 70 | 80 | 90 | 100 |
|  |  | BR *2 | 40 | 30 | 20 | 10 | 0 |
|  |  | SBR *3 | 0 | 0 | 0 | 0 | 0 |
|  | (B) | C$_5$-based resins *4 | 15 | 15 | 15 | 15 | 15 |
|  |  | C$_5$- to C$_9$-based resins *5 | 0 | 0 | 0 | 0 | 0 |
|  |  | C$_9$-based resins *6 | 0 | 0 | 0 | 0 | 0 |
|  |  | terpene-phenol resins *7 | 0 | 0 | 0 | 0 | 0 |
|  |  | rosin-based resins *8 | 0 | 0 | 0 | 0 | 0 |
|  |  | alkylphenol-based resins *9 | 0 | 0 | 0 | 0 | 0 |
|  |  | dicyclopentadiene resins *10 | 0 | 0 | 0 | 0 | 0 |
|  | (C) | CB *11 | 8 | 8 | 8 | 8 | 8 |
|  |  | Silica A *12 | 72 | 72 | 72 | 72 | 72 |
|  |  | Silica B *13 | 0 | 0 | 0 | 0 | 0 |
|  |  | Silica C *14 | 0 | 0 | 0 | 0 | 0 |
|  |  | Silica D *15 | 0 | 0 | 0 | 0 | 0 |
|  | (D) | Aroma Oil | 0 | 0 | 0 | 0 | 0 |
|  |  | Naphthene Oil | 0 | 0 | 0 | 0 | 0 |
|  |  | Palm Oil | 0 | 0 | 0 | 0 | 0 |
|  | Stearic Acid |  | 2 | 2 | 2 | 2 | 2 |
|  | Antioxidant *16 |  | 1 | 1 | 1 | 1 | 1 |
|  | Zinc Oxide |  | 2 | 2 | 2 | 2 | 2 |
|  | Vulcanization Accelerator *17 |  | 0.8 | 0.8 | 0.8 | 0.8 | 0.8 |
|  | Sulfur |  | 1.5 | 1.5 | 1.5 | 1.5 | 1.5 |
| Silica Content (mass %) in Filler (C) |  |  | 90 | 90 | 90 | 90 | 90 |
| Content (mass %) of Filler (C) |  |  | 80 | 80 | 80 | 80 | 80 |
| Tire Performance | Braking Performance on a Steel-Plate Wet Road Surface |  | 100 | 106 | 108 | 110 | 112 |
|  | Braking Performance on a Dry Road Surface |  | 100 | 102 | 104 | 106 | 107 |

TABLE 5

|  |  |  | Comparative Example 20 | Comparative Example 21 | Comparative Example 22 | Comparative Example 23 | Comparative Example 24 |
|---|---|---|---|---|---|---|---|
| Rubber Composition Formulation (parts by mass) | (A) | NR *1 | 60 | 70 | 80 | 90 | 100 |
|  |  | BR *2 | 40 | 30 | 20 | 10 | 0 |
|  |  | SBR *3 | 0 | 0 | 0 | 0 | 0 |
|  | (B) | C$_5$-based resins *4 | 0 | 0 | 0 | 0 | 0 |
|  |  | C$_5$- to C$_9$-based resins *5 | 0 | 0 | 0 | 0 | 0 |
|  |  | C$_9$-based resins *6 | 0 | 0 | 0 | 0 | 0 |
|  |  | terpene-phenol resins *7 | 0 | 0 | 0 | 0 | 0 |
|  |  | rosin-based resins *8 | 0 | 0 | 0 | 0 | 0 |
|  |  | alkylphenol-based resins *9 | 0 | 0 | 0 | 0 | 0 |
|  |  | dicyclopentadiene resins *10 | 0 | 0 | 0 | 0 | 0 |

TABLE 5-continued

|  |  | Comparative Example 20 | Comparative Example 21 | Comparative Example 22 | Comparative Example 23 | Comparative Example 24 |
|---|---|---|---|---|---|---|
| (C) | CB *11 | 8 | 8 | 8 | 8 | 8 |
|  | Silica A *12 | 72 | 72 | 72 | 72 | 72 |
|  | Silica B *13 | 0 | 0 | 0 | 0 | 0 |
|  | Silica C *14 | 0 | 0 | 0 | 0 | 0 |
|  | Silica D *15 | 0 | 0 | 0 | 0 | 0 |
| (D) | Aroma Oil | 15 | 15 | 15 | 15 | 15 |
|  | Naphthene Oil | 0 | 0 | 0 | 0 | 0 |
|  | Palm Oil | 0 | 0 | 0 | 0 | 0 |
|  | Stearic Acid | 2 | 2 | 2 | 2 | 2 |
|  | Antioxidant *16 | 1 | 1 | 1 | 1 | 1 |
|  | Zinc Oxide | 2 | 2 | 2 | 2 | 2 |
|  | Vulcanization Accelerator *17 | 0.8 | 0.8 | 0.8 | 0.8 | 0.8 |
|  | Sulfur | 1.5 | 1.5 | 1.5 | 1.5 | 1.5 |
| Silica Content (mass %) in Filler (C) |  | 90 | 90 | 90 | 90 | 90 |
| Content (parts by mass) of Filler (C) |  | 80 | 80 | 80 | 80 | 80 |
| Tire Performance | Braking Performance on a Steel-Plate Wet Road Surface | 100 | 101 | 102 | 103 | 104 |
|  | Braking Performance on a Dry Road Surface | 100 | 102 | 103 | 104 | 104 |

TABLE 6

|  |  |  | Comparative Example 25 | Comparative Example 26 | Comparative Example 27 | Comparative Example 28 |
|---|---|---|---|---|---|---|
| Rubber Composition Formulation (parts by mass) | (A) | NR *1 | 60 | 60 | 60 | 60 |
|  |  | BR *2 | 40 | 40 | 40 | 40 |
|  |  | SBR *3 | 0 | 0 | 0 | 0 |
|  | (B) | C$_5$-based resins *4 | 15 | 15 | 15 | 15 |
|  |  | C$_5$- to C$_9$-based resins *5 | 0 | 0 | 0 | 0 |
|  |  | C$_9$-based resins *6 | 0 | 0 | 0 | 0 |
|  |  | terpene-phenol resins *7 | 0 | 0 | 0 | 0 |
|  |  | rosin-based resins *8 | 0 | 0 | 0 | 0 |
|  |  | alkylphenol-based resins *9 | 0 | 0 | 0 | 0 |
|  |  | dicyclopentadiene resins *10 | 0 | 0 | 0 | 0 |
|  | (C) | CB *11 | 48 | 40 | 32 | 8 |
|  |  | Silica A *12 | 32 | 40 | 48 | 72 |
|  |  | Silica B *13 | 0 | 0 | 0 | 0 |
|  |  | Silica C *14 | 0 | 0 | 0 | 0 |
|  |  | Silica D *15 | 0 | 0 | 0 | 0 |
|  | (D) | Aroma Oil | 0 | 0 | 0 | 0 |
|  |  | Naphthene Oil | 0 | 0 | 0 | 0 |
|  |  | Palm Oil | 0 | 0 | 0 | 0 |
|  |  | Stearic Acid | 2 | 2 | 2 | 2 |
|  |  | Antioxidant *16 | 1 | 1 | 1 | 1 |
|  |  | Zinc Oxide | 2 | 2 | 2 | 2 |
|  |  | Vulcanization Accelerator *17 | 0.8 | 0.8 | 0.8 | 0.8 |
|  |  | Sulfur | 1.5 | 1.5 | 1.5 | 1.5 |
| Silica Content (mass %) in Filler (C) |  |  | 40 | 50 | 60 | 90 |
| Content (parts by mass) of Filler (C) |  |  | 80 | 80 | 80 | 80 |
| Tire Performance | Braking Performance on a Steel-Plate Wet Road Surface |  | 100 | 101 | 102 | 105 |
|  | Braking Performance on a Dry Road Surface |  | 100 | 99 | 98 | 94 |

*1 . . . natural rubber RSS#3
*2 . . . butadiene rubber BR01
*3 . . . styrene-butadiene copolymer rubber #1500
*4 . . . C$_5$-based resins, ExxonMobil Chemical Company, trade named "ECR1102"
*5 . . . C$_5$- to C$_9$-based resins, ExxonMobile Chemical Company, trade named "ECR213"
*6 . . . C$_9$-based resins, Nippon Petrochemicals Co., Ltd., trade named "Neopolymer 140"
*7 . . . terpene-phenol resins, YASUHARA CHEMICAL Colo., LTD., trade named "YS Polystar T100"
*8 . . . rosin-based resins, Taisha Sho Seiyu (Taisha Pine Essential Oil Co., Ltd.), trade named "Hairojin S"
*9 . . . alkylphenol-based resins, SI GROUP Inc., trade named "R7510PJ"
*10 . . . dicyclopentadiene resins, Nippon Zeon Co., Ltd., trade named "Quinton 1105"
*11 . . . Carbon Black ISAF
*12 . . . Silica A, Tosoh Silica Corporation, trade named "Nipsil AQ", BET specific surface area: 205 m$^2$/g
*13 . . . Silica B, Evonik Industries AG, trade named "ULTRASIL VN3", BET specific surface area: 175 m$^2$/g
*14 . . . Silica C, Tosoh Silica Corporation, trade named "Nipsil" as made to order, CTAB: 191 m$^2$/g
*15 . . . Silica D, Tosoh Silica Corporation, trade named "Nipsil" as made to order, CTAB: 94 m$^2$/g
*16 . . . antioxidant, 6PPD
*17 . . . vulcanization accelerator, DPG The results shown in Tables 1 to 6 have found that the disclosed rubber composition allows for manufacturing a tread rubber that is high in braking performance on a dry road surface and also high in braking performance even on a wet road surface such as a manhole surface that is slipperier than an asphalt road surface.

INDUSTRIAL APPLICABILITY

The disclosed rubber composition is available as tire tread rubber, and may be used mainly in a tire production industry.

The invention claimed is:

1. A rubber composition prepared by compounding a rubber component (A) comprising a natural rubber by 70 mass % or more, and by further compounding, with the rubber component as 100 parts by mass: (B) at least one kind of thermoplastic resins selected from among $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, at 5 parts by mass to 50 parts by mass; and (C) a filler including silica and carbon black, at 20 parts by mass to 120 parts by mass,
  wherein a ratio of silica in the filler (C) is 90 mass % or more and less than 100 mass % and a ratio of carbon black in the filler (C) is more than 0 mass % and 10 mass % or less.

2. The rubber composition according to claim 1, wherein the rubber component (A) comprises a styrene-butadiene copolymer rubber by 10 mass % to 30 mass %.

3. A tire using the rubber composition according to claim 1, as a tread rubber.

4. The rubber composition according to claim 1, prepared by further compounding a naphthene oil at 10 parts by mass or less with the rubber component (A) as 100 parts by mass.

5. The rubber composition according to claim 1, wherein the rubber component (A) comprises a natural rubber by 80 mass% or more.

6. The rubber composition according to claim 1, wherein the rubber component (A) further comprises a rubber material selected from the group consisting of butadiene rubber, acrylonitrile-butadiene copolymer rubber, chloroprene rubber, and polyisoprene rubber.

7. The rubber composition according to claim 1, wherein the at least one kind of thermoplastic resins is $C_5$-based resins comprising a copolymer including, as main components, isoprene, cyclopentadiene, 1,3-pentadiene, and 1-pentene; a copolymer of 2-pentene and dicyclopentadiene; and a polymer mainly composed of 1,3-pentadiene.

8. The rubber composition according to claim 1, wherein the at least one kind of thermoplastic resins is $C_5$- to $C_9$-based resins comprising a copolymer including, as main components, styrene, vinyltoluene, a-methylstyrene, and indene.

9. The rubber composition according to claim 1, wherein the at least one kind of thermoplastic resins is $C_9$-based resins comprising a copolymer including, as main components, indene, a-methylstyrene, and vinyltoluene.

10. The rubber composition according to claim 1, wherein the at least one kind of thermoplastic resins is terpene-based resins comprising ⊖-pinene resins; and α-pinene resins.

11. The rubber composition according to claim 1, wherein the at least one kind of thermoplastic resins is terpene-aromatic compound-based resins comprising terpene-phenol resins.

12. The rubber composition according to claim 1, wherein the at least one kind of thermoplastic resins is rosin-based resins comprising as a natural resin rosin: a gum rosin, a tall oil rosin, and a wood rosin, which are included in a raw rosin or a tall oil; and also include, as a modified rosin, a rosin derivative, and a modified rosin derivative, for example: a polymeric rosin and its partially hydrogenated rosin; a glycerin ester rosin and its partially hydrogenated rosin or completely hydrogenated rosin; and a pentaerythritol ester rosin and its partially hydrogenated rosin or polymeric rosin.

13. The rubber composition according to claim 1, wherein the at least one kind of thermoplastic resins is dicyclopentadiene resins comprising resins obtained by polymerizing dicyclopentadiene using a catalyst for the Friedel-Crafts reaction selected from the group consisting of $AlCl_3$ and $BF_3$.

* * * * *